US006888793B1

(12) United States Patent
Orui

(10) Patent No.: US 6,888,793 B1
(45) Date of Patent: May 3, 2005

(54) INTERNET PROTOCOL NETWORK ALTERNATE ROUTING SYSTEM

(75) Inventor: Takeo Orui, Tokyo (JP)

(73) Assignee: NEC Corporation, Tokyo (JP)

(*) Notice: Subject to any disclaimer, the term of this patent is extended or adjusted under 35 U.S.C. 154(b) by 880 days.

(21) Appl. No.: 09/583,166

(22) Filed: May 30, 2000

(30) Foreign Application Priority Data

Jun. 1, 1999 (JP) .......................................... 11-154078

(51) Int. Cl.[7] .............................................. H04L 12/26
(52) U.S. Cl. ...................... 370/229; 370/237; 370/352; 370/395.52; 370/401; 370/466; 709/235
(58) Field of Search ................................ 370/229, 230, 370/232, 233, 234, 235, 237, 351, 352, 353, 354, 535, 356, 401, 395.52, 402, 465, 466, 467, 468, 474, 355; 709/223, 224, 235, 238

(56) References Cited

U.S. PATENT DOCUMENTS

| | | | |
|---|---|---|---|
| 6,052,734 A | | 4/2000 | Ito et al. |
| 6,154,445 A | * | 11/2000 | Farris et al. ................. 370/237 |
| 6,233,248 B1 | * | 5/2001 | Sautter et al. ............... 370/465 |
| 6,463,051 B1 | * | 10/2002 | Ford ........................... 370/352 |
| 6,628,666 B1 | * | 9/2003 | Pickering et al. ........... 370/468 |
| 6,643,496 B1 | * | 11/2003 | Shimoyama et al. ......... 455/69 |
| 2001/0023454 A1 | * | 9/2001 | Fitzgerald .................... 709/233 |

FOREIGN PATENT DOCUMENTS

| | | | |
|---|---|---|---|
| GB | 2001-515314 | 9/2001 | ........... H04L/12/56 |
| JP | 10-224408 A | 8/1998 | ........... H04L/12/66 |
| JP | 10-247944 | 9/1998 | ........... H04L/11/20 |
| JP | 10-308967 A | 11/1998 | ........... H04Q/3/58 |
| JP | 11-17738 A | 1/1999 | ........... H04L/11/20 |
| JP | 11-27316 A | 1/1999 | ........... H04L/12/56 |
| JP | 11-103340 A | 4/1999 | ........... H04M/3/00 |
| JP | 11-122296 A | 4/1999 | ........... H04L/12/56 |
| JP | 11-225206 A | 8/1999 | ........... H04M/3/00 |

* cited by examiner

*Primary Examiner*—Dang Ton
*Assistant Examiner*—Shick Hom
(74) *Attorney, Agent, or Firm*—Foley & Lardner LLP

(57) ABSTRACT

An Internet protocol network alternate routing system comprises: a traffic control unit for detecting the state of congestion of an LAN, which is an Internet protocol network; a call control unit for establishing a link between an extension telephone and the LAN based on the detection results of the traffic control unit; a central processing unit for designating the signal path of voice signals that are transmitted from the extension telephone based on the results of establishing a link in the call control unit; and a switch control unit for switching the signal path that connects a path to the extension telephone. In a case in which the call control unit does not establish a link, voice signals that are transmitted from the extension telephone are rerouted by switching performed by the switch control unit to a leased line network by way of a leased line trunk.

12 Claims, 3 Drawing Sheets

INTERNET PROTOCOL NETWORK ALTERNATE ROUTING SYSTEM

BACKGROUND OF THE INVENTION

1. Field of the Invention:

The present invention relates to an Internet protocol network alternate routing system for rerouting voice signals that are transmitted from an extension telephone from a signal path connected to an Internet protocol network to a leased line or an office line.

2. Description of the Related Art

In recent years, Internet protocol (herein-below abbreviated as IP) networks, in which data and voice signals are integrated and transmitted, have been used in business networks, and efforts are now being made to reduce the operating costs of these networks. In a conventional system that uses an IP network, networks are connected together via analog interfaces or digital interfaces by means of gateway devices, and these gateway devices are further connected to private branch exchanges (herein-below abbreviated PBX) that are connected to telephones and computer terminals. Telephones and computer terminals are therefore connected to each other by way of IP networks.

In a PBX that is provided within an IP network, voice signals are converted to packets and then transmitted. However, there has been the problem that the real-time reproduction of packet voice signals is prevented by the occurrence of trouble or congestion within the IP network, and the level of service is therefore reduced.

This problem has occurred because voice signals could not be rerouted from a signal path that passes by way of an IP network to a TDM (Time Division Multiplexer) leased line or a public telecommunication network. This type of alternate routing could not be realized in a conventional IP network.

SUMMARY OF THE INVENTION

The present invention was developed in view of the above-described problem of the prior art and has the object of providing an IP network alternate routing system that is capable of rerouting voice signals that are transmitted from an extension telephone to a TDM leased line or to a public telecommunication network when trouble or congestion occurs in an IP network.

To achieve the above-described object, the present invention features:

an Internet protocol network alternate routing system having an extension telephone, a plurality of networks provided with one Internet protocol network for transmitting voice signals from the extension telephone, and an exchange for controlling connections between the extension telephone and the plurality of networks, the exchange, upon detecting a state of congestion of the Internet protocol network, automatically switches the network that is connected with the extension telephones to a network other than the Internet protocol network.

The exchange is provided with:

a plurality of signal paths for connecting the plurality of networks with the extension telephone;

an alternate routing control unit for determining the network that is to be connected with the extension telephone;

a call control unit for establishing a link between the network that has been determined by the alternate routing control unit and the extension telephone;

a traffic control unit for detecting the state of congestion of a network for which a link was established by the call control unit; and a switch control unit that controls the connection between the extension telephone and a signal path among the plurality of signal paths that is connected to a network, based on the detection results in the traffic control unit.

The exchange further includes:

a voice converter that, when a link has been established with a partner node by the call control unit and voice signals are transmitted from the extension telephone by way of the switch control unit, converts the transmitted voice signals to packets, assigns port numbers to each of the packet voice signals, and outputs the voice signals;

wherein the traffic control unit adds Internet protocol addresses that are outputted from the call control unit to voice signals outputted from the voice converter to generate and output Internet protocol packets;

and further, the exchange includes:

an RTP unit for adding RTP headers to Internet protocol packets outputted from the traffic control unit and outputting the result; and a network driver for transmitting on an Internet protocol network Internet protocol packets to which RTP headers have been added and that have been outputted from the RTP unit.

In addition, in a case in which Internet protocol packets to which RTP headers have been added are transmitted from the Internet protocol network, the RTP unit removes the RTP headers and outputs to the traffic control unit;

the traffic control unit converts the Internet protocol addresses contained in the Internet protocol packets that are outputted from the RTP unit to port numbers of ports in the voice converter, and outputs each of the Internet protocol packets that are assigned by port in the voice converter to a respective port in the voice converter;

and the voice converter converts the Internet protocol packets that are outputted from the traffic control unit to voice signals, reconfigures the converted voice signals, and transmits to the extension telephone by way of the switch control unit.

In addition, the traffic control unit detects a packet loss rate that is contained in a sender report packet that is transmitted from the Internet protocol network, and informs the call control unit that the packet loss rate has exceeded a predetermined set value if the packet loss rate exceeds the set value; and the call control unit is provided with a counter in which the count value is incremented with each notification from the traffic control unit that the packet loss rate has exceeded a set value, and the call control unit does not establish a link between the Internet protocol network and the extension telephone if the count value exceeds a predetermined set value.

In addition, the packet loss rate in the sender report packet is variable.

The switch control unit may also be manually switched. [The invention is further features] an announcement trunk for reporting switching of the signal path to the extension telephone when the network that was determined by the alternate routing control unit is in a congested state.

(Operation)

In the present invention configured according to the above description, when voice signals transmitted from the extension telephone are transmitted on an Internet protocol network, the state of congestion of the Internet protocol network is judged by the call control unit based on sender packets that are transmitted from the Internet protocol network; and when the Internet protocol network is judged to be in a congested state, the signal path of the voice signals is switched by the switch control unit and the voice signals are rerouted from the Internet protocol network to a network other than the Internet protocol network.

Voice signals that are transmitted from the extension telephone are thus automatically rerouted to a network other than the Internet protocol network when the Internet protocol network is in a congested state, and the level of service of the system can therefore be maintained.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

An explanation of embodiments of the present invention is next presented with reference to the accompanying figures.

Figure 1:
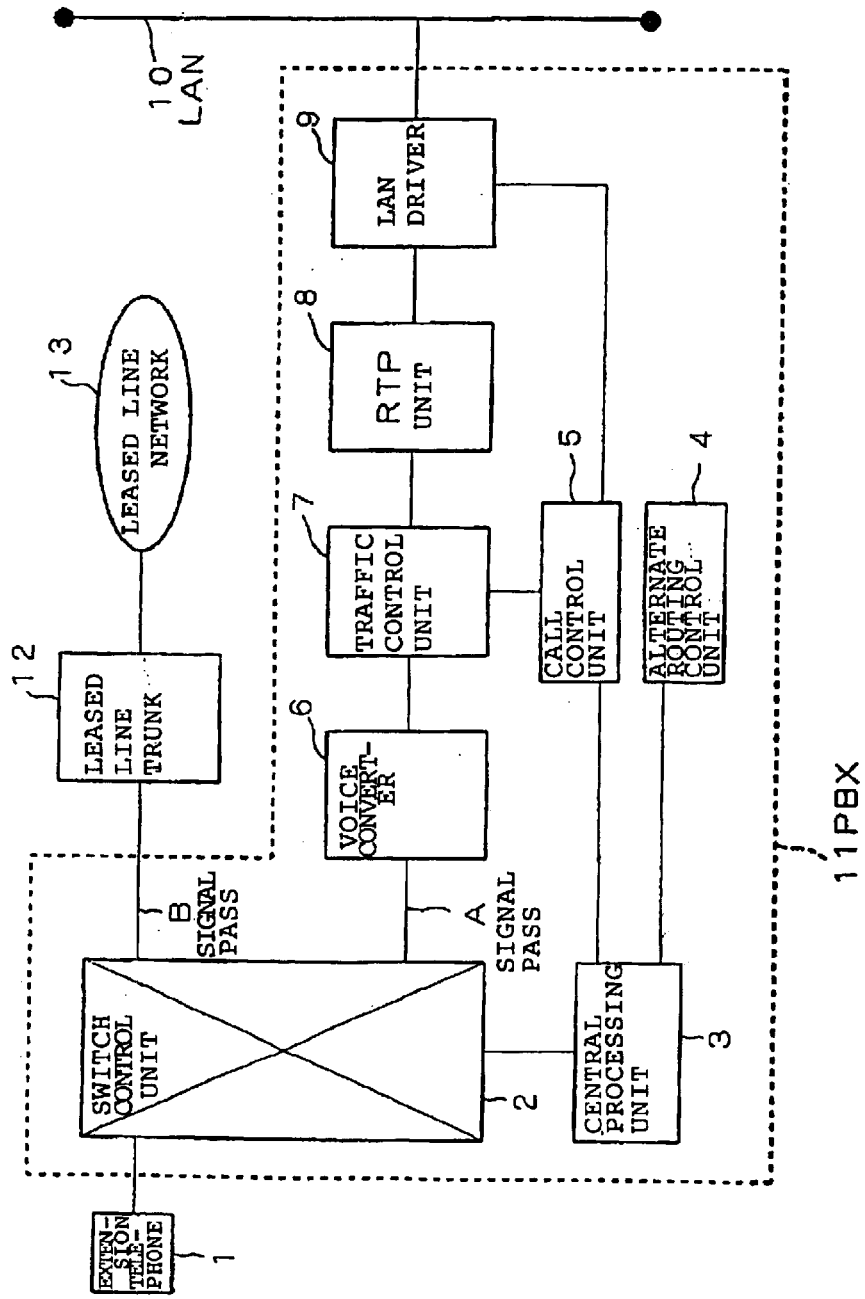
FIG. 1 shows one embodiment of the Internet protocol network alternate routing system of the present invention.

FIG. 1 shows one embodiment of the IP network alternate routing system of the present invention. As shown in FIG. 1, the present embodiment is made up by: an extension telephone 1 that transmits PCM (Pulse Code Modulation) voice signals; LAN (Local Area Network) 10, which is an IP network for transmitting the PCM voice signals that are transmitted from extension telephone 1; leased line network 13, which is a line different from LAN 10, for transmitting PCM voice signals that are transmitted from extension telephone 1; leased line trunk 12 for rerouting PCM voice signals that are transmitted from extension telephone 1 to leased line network 13; and PBX (Private Branch Exchange) 11, which is an exchange for connecting the signal path of PCM voice signals that are transmitted from extension telephone 1 to one of LAN 10 and leased line network 13.

In addition, extension telephone 1 is assigned in advance with a service class for determining the signal path by which PCM voice signals are to be transmitted. PBX 11 is made up of: central processing unit 3 that designates the signal path by which PCM voice signals are transmitted from extension telephone 1; switch control unit 2 for switching the signal path that is path-connected to extension telephone 1 based on the signal path designated by central processing unit 3; LAN driver 9, which is a network driver at the interface for LAN 10; alternate routing control unit 4 for determining the signal path of the PCM voice signals that are transmitted from extension telephone 1 in accordance with the service class that is assigned in advance to extension telephone 1 and notifying the determined signal path to central processing unit 3; call control unit 5 for both converting the number of the partner node that was dialed by extension telephone 1 to an IP address and outputting the result when the signal path notified to central processing unit 3 is signal path A to LAN 10 and establishing a link to the partner node by way of LAN driver 9 and LAN 10; voice converter 6 for converting to packets the PCM voice signals that are transmitted from extension telephone 1 by way of switch control unit 2 when a link to the partner node has been established by call control unit 5, assigning port numbers to each of the PCM voice signal packets, and outputting the PCM voice signals; traffic control unit 7 for adding IP addresses outputted from call control unit 5 to PCM voice signals that are outputted from voice converter 6 to generate and output IP packets; RTP unit 8 for adding RTP (Real-time Transport Protocol) headers to IP packets outputted from traffic control unit 7 and transmitting to the partner node by way of LAN driver 9 and LAN 10. When IP packets to which RTP headers have been added are transmitted from a partner node to LAN driver 9 by way of LAN 10, the RTP headers that have been added to the IP packets are removed by RTP unit 8, the IP headers included in the IP packets are converted by traffic control unit 7 to port numbers of voice converter 6, the IP packets that are assigned by port number in voice converter 6 are outputted to each port in voice converter 6, the IP packets assigned by port number are converted to PCM voice signals by voice converter 6, and the converted PCM voice signals are reconfigured and transmitted by way of switch control unit 2 to extension telephone 1.

The signal paths that are path-connected to extension telephone 1 by switch control unit 2 are constituted by signal path A, over which PCM voice signals are transmitted by way of LAN 10, and signal path B, over which PCM voice signals are transmitted by way of leased line network 13.

In switch control unit 2, signal paths may be switched either automatically in accordance with instructions from central processing unit 3 or by manual operation.

In addition, the RTP headers that are added to IP packets by RTP (Real-time Transport Protocol) unit 8 are provided for realizing real-time transmission of IP packets by RTP on LAN 10.

When IP packets are transmitted by RTP, RTCP (RTP Control Protocol) for confirming transmission or monitoring IP packets is appended when transmitting IP packets or when notifying of the establishment of a link to a partner node. As a result, an RTCP sender report packet, which is a sender report packet, is transmitted from LAN 10 to LAN driver 9 when transmitting IP packets or when reporting the establishment of a link to a partner node, and in call control unit 5, a link is established to the partner node by way of LAN 10 based on this RTCP sender report packet.

Explanation is next presented regarding signal transmission operations in the IP network alternate routing system that is configured according to the above-described description.

Explanation is first presented regarding the operations when transmitting PCM voice signals from extension telephone 1 to a partner node.

When the number of a partner node is dialed by extension telephone 1, an inquiry of the order of alternate routing is sent from central processing unit 3 to alternate routing control unit 4.

Based on the service class that was assigned in advance to extension telephone 1, the first signal path is then determined in alternate routing control unit 4 to be signal path A, which is connected to the partner node by way of LAN 10, which is path-connected to voice converter 6. Central processing unit 3 is then notified that the first signal path is signal path A.

In some cases, the first signal path is determined, according to the service class that is assigned in advance to extension telephone 1, to be signal path B, which is connected to the partner node by way of leased line network 13 and path-connected to leased line trunk 12.

Central processing unit 3 instructs call control unit 5 to establish a link to the partner node by way of LAN 10.

Upon being instructed by central processing unit 3 to establish a link, call control unit 5 converts the number of the partner node that was dialed by extension telephone 1 to an IP address and establishes a link via LAN drive 9 and LAN 10 to the partner node having the converted IP address.

At this time, the IP address that was converted from the number of the partner node by call control unit 5 is outputted from call control unit 5 to traffic control unit 7.

Upon notification from call control unit 5 that a link has been established to the partner node by way of LAN driver 9 and 10, an RTCP sender report packet that is defined by RTCP is transmitted from LAN 10 to LAN driver 9, following which the RTCP sender report packet that was transmitted to LAN driver 9 is transmitted from LAN driver 9 to traffic control unit 7 by way of RTP unit 8.

In traffic control unit 7, the state of congestion of LAN 10 is checked ba ed on the RTCP sender report packet that was transmitted from LAN 10, and the state of congestion of LAN 10 that was checked is then reported to call control unit 5.

In call control unit 5, the state of congestion of LAN 10 is judged based on the check of the RTCP sender report packet at traffic control unit 7.

If it is hereupon judged in call control unit 5 that LAN 10 is not in a congested state and that a link has been established to the partner node by way of LAN 10, the establishment of a link is reported from call control unit 5 to central processing unit 3.

Central processing unit 3 next instructs switch control unit 2 and call control unit 5 to reproduce the PCM voice signals that were transmitted from extension telephone 1, following which extension telephone 1 and voice converter 6 are path-connected by switch control unit 2, and PCM voice signals are subsequently transmitted from extension telephone 1 to the partner node by way of LAN 10.

When the reproduction of PCM voice signals that were transmitted from extension telephone 1 is instructed from central processing unit 3, the PCM voice signals transmitted from extension telephone 1 are converted to packets in voice converter 6, a port number is assigned to each of the packet PCM voice signals, and the packet PCM voice signals that have been assigned port numbers are outputted to traffic control unit 7.

Traffic control unit 7 next adds IP addresses, which have been outputted from call control unit 5, to the PCM voice signals, which have been outputted from voice converter 6, to generate IP packets; and outputs the generated IP packets to RTP unit 8.

In RTP unit 8, RTP headers are then added to the IP packets that have been outputted from traffic control unit 7, and the IP packets to which RTP headers have been added are then transmitted to the partner node by way of LAN driver 9 and LAN 10.

If, on the other hand, call control unit 5 judges that LAN 10 is in a congested state and a link is not established to the partner node by way of LAN 10, central processing unit 3 is notified from call control unit 5 that a link has not been established.

In the event of faults in the interface with LAN 10 in the partner node as well, a link is not established with the partner node, and call control unit 5 therefore similarly notifies central processing unit 3 that a link has not been established.

Upon notification from call control unit 5 to central processing unit 3 that a link has not been established on LAN 10 with the partner node, central processing unit 3 sends an inquiry to alternate routing control unit 4 for a second signal path.

Based on the service class that was assigned in advance to extension telephone 1, alternate routing control unit 4 next determines the second signal path to be signal path B, which is connected to the partner node by way of the leased line network 13 that is path-connected to leased line trunk 12, and notifies central processing unit 3 that the second signal path is signal path B.

Central processing unit 3 next instructs switch control unit 2 to reroute PCM voice signals that are transmitted from extension telephone 1 to signal path B, following which extension telephone 1 and leased line trunk 12 are path-connected by switch control unit 2 and PCM voice signals are subsequently transmitted from extension telephone 1 to the partner node by way of leased line network 13 that has been rerouted to signal path B.

Explanation is next presented regarding operation when IP packets to which RTP headers are added are transmitted from the partner node to LAN driver 9 via LAN 10.

When IP packets to which RTP headers have been added are transmitted to LAN driver 9 by way of LAN 10, the RTP headers that were added to the IP packets that are transmitted to LAN driver 9 are removed in RTP unit 8, following which the IP packets from which the RTP headers have been removed are outputted to traffic control unit 7. In traffic control unit 7, the IP headers that are included in the IP packets that have been outputted from RTP unit 8 are next converted to port numbers of voice converter 6, and each of the IP packets that have been assigned to a port number of voice converter 6 are then outputted to the corresponding port provided in voice converter 6.

In voice converter 6, the IP packets outputted from traffic control unit 7 are converted to PCM voice signals at each of the incorporated ports, whereby the converted PCM voice signals are reconfigured and transmitted to extension telephone 1.

The operation for establishing links in call control unit 5 shown in FIG. 1 is next explained in more detail.

Figure 2:
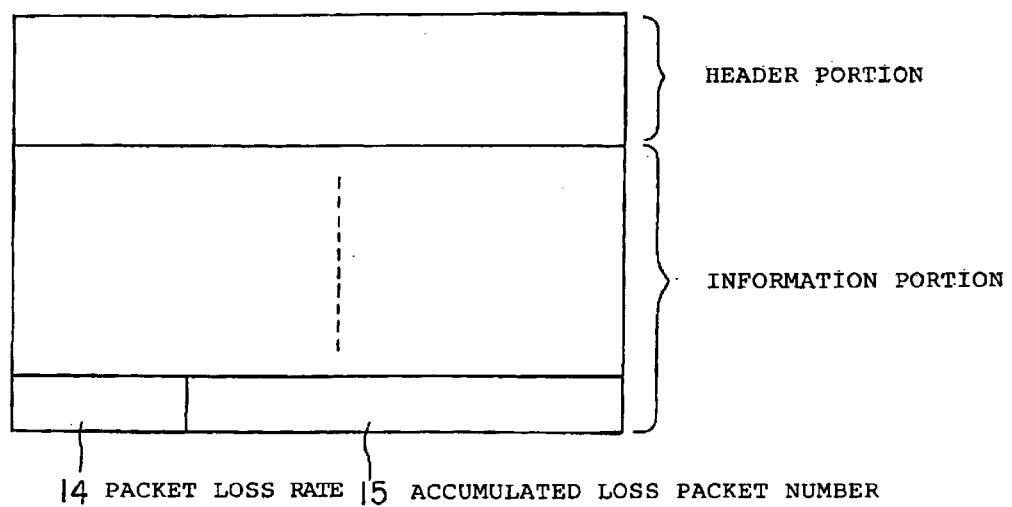
FIG. 2 shows one configuration of the RTCP sender report packet that is transmitted from a LAN upon establishing a link in the call control unit shown in FIG. 1.

FIG. 2 shows an example of the composition of an RTCP sender report packet that is transmitted from LAN 10 at the time a link is established in call control unit 5 shown in FIG. 1.

As shown in FIG. 2, this composition is made up of a header portion and an information portion, and part of the information portion includes packet loss rate 14 and accumulated loss packet number 15, and this information is used for judging the start of congestion and the end of congestion in LAN 10.

Packet loss rate 14 in the RTCP sender report packet is a variable and is set to match a user's level of use.

When the establishment of a link to the partner node by way of LAN 10 is notified from call control unit 5, an RTCP sender report packet is transmitted from LAN 10 to traffic control unit 7 by way of LAN driver 9 and RTP unit 8.

Packet loss rate 14 in the RTCP sender report packet that is transmitted from LAN 10 by way of LAN driver 9 and RTP unit 8 is checked in traffic control unit 7. If packet loss rate 14 exceeds a predetermined set value, call control unit 5 is notified that packet loss rate 14 has exceeded the set value.

With each notification from traffic control unit 7 that packet loss rate 14 has exceeded the set value, the count value in a counter incorporated in call control unit 5 is incremented as the number of instances of congestion.

When packet loss rate 14 continuously exceeds the set value, the number of instances of congestion counted by the counter provided inside call control unit 5 may exceed a prescribed number, in which case call control unit 5 judges that LAN 10 is in a state of congestion, and call control unit 5 notifies central processing unit 3 that LAN 10 is in a state of congestion.

Upon being notified from call control unit 5 that LAN 10 is in a congested state, central processing unit 3 notifies alternate routing control unit 4 that signal path A, which is the first signal path, is in a congested state, following which inquiry is made regarding the second signal path.

When inquiry is made from central processing unit 3 regarding the second signal path, alternate routing control unit 4 notifies central processing unit 3 that the signal path that is set as the second signal path is signal path B, which is connected to the partner node by way of leased line network 13, which is in turn path-connected to leased line trunk 12.

Central processing unit 3 next directs switch control unit 2 to reroute PCM voice signals that are transmitted from extension telephone 1, following which extension telephone 1 and leased line trunk 12 are path-connected by switch control unit 2, and PCM voice signals are subsequently transmitted from extension telephone 1 to the partner node by way of leased line network 13. Explanation is next presented regarding a system that reroutes from a signal path that passes by way of an IP network to another signal path in a case in which the IP network encounters a congested state while PCM voice signals are being transmitted from extension telephone 1 to a partner node by way of the IP network.

Figure 3:
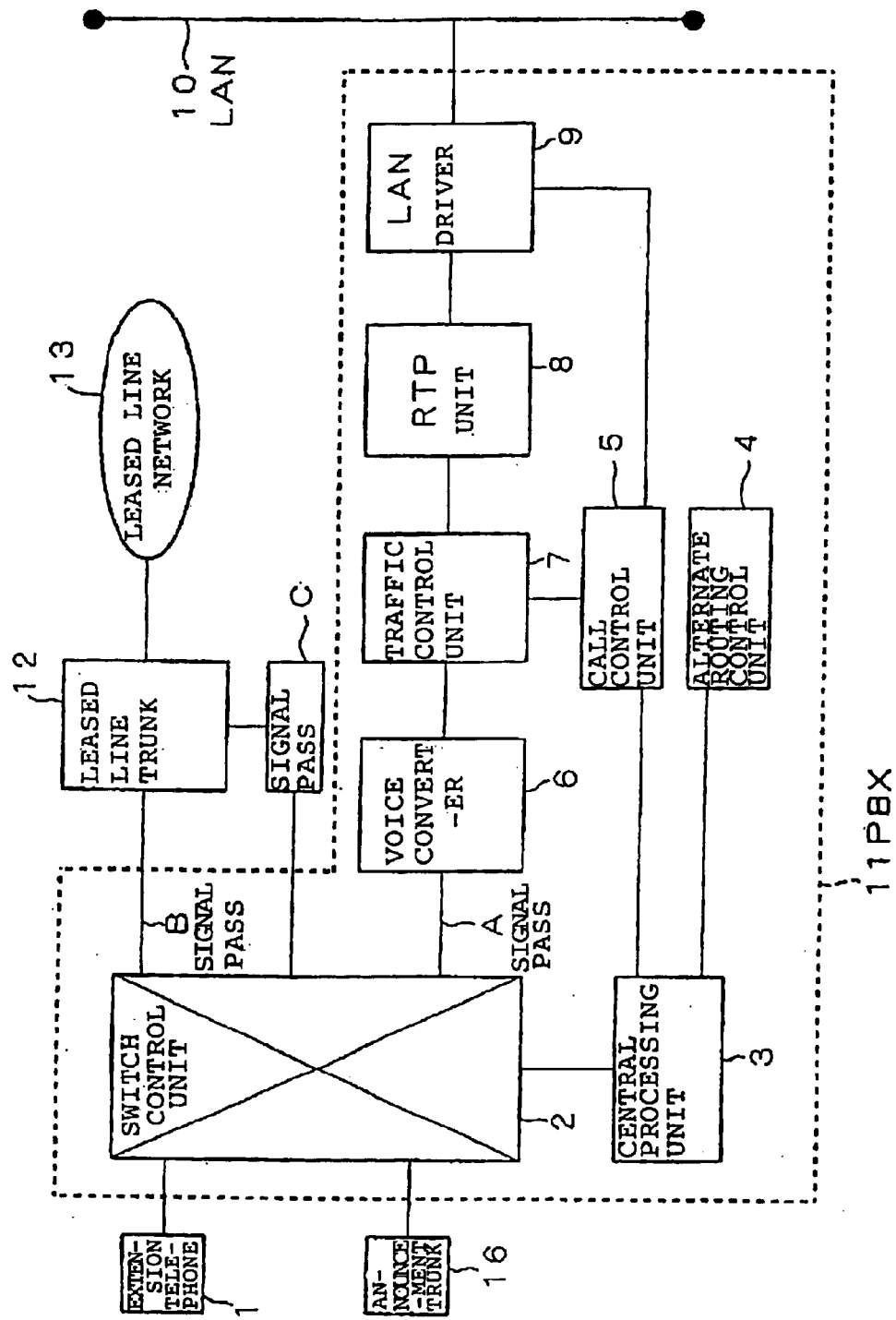
FIG. 3 shows another embodiment of the Internet protocol network alternate routing system of the present invention.

FIG. 3 shows another embodiment of the IP network alternate routing system of the present invention.

In contrast to the system shown in FIG. 1, this embodiment is provided with: announcement trunk 16 for notifying extension telephone 1 via switch control unit 2 that the transmission path has been switched; and signal path C, which is a signal path distinct from signal path B that connects extension telephone 1 and leased line trunk 12 by way of switch control unit 2.

The signal transmission operation in an IP network alternate routing system that is configured according to the foregoing explanation is next explained.

If it is judged in call control unit 5 that LAN 10 is in a congested state during the transmission of PCM voice signals from extension telephone 1 to a partner node via LAN 10, the congested state of LAN 10 is notified from call control unit 5 to central processing unit 3.

Upon receiving notification from call control unit 5 that LAN 10 is in a congested state, central processing unit 3 sends an inquiry to alternate routing control unit 4 regarding the second signal path, following which alternate routing control unit 4 notifies central processing unit 3 that signal path B is the second signal path.

Central processing unit 3 instructs switch control unit 2 to reserve acquisition of leased line trunk 12 by way of signal path B, and at the same time, the link to the partner node via signal path C, leased line trunk 12, and leased line network 13 is established. Upon establishing the link to the partner node via signal path C, leased line trunk 12, and leased line network 13, a path between extension telephone 1 and announcement trunk 16 is connected by switch control unit 2, and the user that is using extension telephone 1 is notified from announcement trunk 16 of the switch to signal path C.

The user that is using extension telephone 1 then manually switches switch control unit 2 to connect the path between extension telephone 1 and signal path C, and PCM voice signals are subsequently transmitted from extension telephone 1 to the partner node by way of leased line trunk 12 and leased line network 13.

In the present invention as described in the foregoing explanation, when voice signals transmitted from the extension telephone are transmitted on an Internet protocol network, the call control unit judges the state of congestion of the Internet protocol network based on a sender packet that is transmitted from the Internet protocol network, and if it judges that the Internet protocol network is in a congested state, a switch control unit switches the signal path the voice signals such that the voice signals are rerouted from the Internet protocol network to a network other than the Internet protocol network, whereby the level of service of the system can be maintained.

Even in a case in which a problem occurs in the interface with the Internet protocol network in the partner node, a link to the partner node is not established, and as a result, voice signals transmitted from the extension telephone are similarly automatically rerouted to a network other than the Internet protocol network.

The packet loss rate for determining the state of congestion of an Internet protocol network is a variable and thus can be set to match a user's level of use.

Finally, voice signals that are transmitted from a user that cannot tolerate deterioration in voice quality (for example, a VIP) can be automatically or manually rerouted to a public network or a TDM leased line, which is a circuit that is distinct from an Internet protocol network.

While preferred embodiments of the present invention have been described using specific terms, such description is for illustrative purposes only, and it is to be understood that changes and variations may be made without departing from the spirit or scope of the following claims.

What is claimed is:

1. An Internet protocol network alternate routing system comprising:
    an extension telephone;
    a plurality of networks including one Internet protocol network for transmitting voice signals from said extension telephone;
    an exchange for controlling a connection between said extension telephone and said plurality of networks; and
    an announcement trunk for reporting switching of said connection between said extension telephone and said plurality of networks when the Internet protocol network is determined by said exchange to be in a congested state;
    wherein said exchange, upon detecting a state of congestion over a first link of said Internet protocol network on which said extension telephone is connected, automatically switches said extension telephone to a second network, said second network being other than said Internet protocol network;
    wherein said exchange comprises:
        a plurality of signal paths for connecting said plurality of networks with said extension telephone;
        an alternate routing control unit for determining which one network among said plurality of networks is to be connected as said second network with said extension telephone;
        a call control unit for establishing a second link between the second network that has been determined by said alternate routing control unit and said extension telephone;

a traffic control unit for detecting a congested state of said Internet protocol network for which said first link has been established by said call control unit;

a switch control unit for controlling said connection between said extension telephone and a signal path among said plurality of signal paths that is connected to the second network, based on detection results in said traffic control unit; and a voice converter that, when said first link has been established with a partner node by said call control unit and voice signals are transmitted from said extension telephone by way of said switch control unit, converts the transmitted voice signals to packets, assigns port numbers to each of the packet voice signals, and outputs the voice signals as outputted voice signals;

wherein said traffic control unit adds Internet protocol addresses that are outputted from said call control unit to said outputted voice signals outputted from said voice converter to generate and output Internet protocol packets as outputted Internet protocol packets; and wherein said exchange further comprises:

an RTP (Real-time Transport Protocol) unit for adding RTP headers to said outputted Internet protocol packets outputted from said traffic control unit and outputting the header-added Internet protocol packets; and a network driver for transmitting on said Internet protocol network said header-added Internet protocol packets outputted from said RTP unit.

2. The Internet protocol network alternate routing system according to claim 1, wherein:

said RTP unit, in a case in which Internet protocol packets to which RTP headers have been added are transmitted from said Internet protocol network, removes the RTP headers and outputs Internet protocol packets to said traffic control unit;

said traffic control unit converts Internet protocol addresses contained in Internet protocol packets that are outputted from said RTP unit to port numbers of ports in said voice converter, and outputs each of Internet protocol packets that are assigned by port in said voice converter to a respective port in said voice converter, and said voice converter converts Internet protocol packets that are outputted from said traffic control unit to voice signals, reconfigures converted voice signals, and transmits to said extension telephone by way of said switch control unit.

3. The Internet protocol network alternate routing system according to claim 2 wherein:

said traffic control unit detects a packet loss rate that is contained in a sender report packet that is transmitted from said Internet protocol network and notifies said call control unit that said packet loss rate has exceeded a predetermined set value if said packet loss rate exceeds the set value; and said call control unit is provided with a counter in which a count value is incremented with each notification from said traffic control unit that said packet loss rate has exceeded a set value, and said call control unit does not establish a link between said Internet protocol network and said extension telephone if the count value exceeds a predetermined set value.

4. The Internet protocol network alternate routing system according to claim 2 wherein said switch control unit can be manually switched.

5. The Internet protocol network alternate routing system according to claim 3 wherein the packet loss rate in said sender report packet is variable.

6. The Internet protocol network alternate routing system according to claim 3 wherein said switch control unit can be manually switched.

7. The Internet protocol network alternate routing system according to claim 5 wherein said switch control unit can be manually switched.

8. The Internet protocol network alternate routing system according to claim 1 wherein:

said traffic control unit detects a packet loss rate that is contained in a sender report packet that is transmitted from said Internet protocol network and notifies said call control unit that said packet loss rate has exceeded a predetermined set value if said packet loss rate exceeds the predetermined set value; and said call control unit is provided with a counter in which a count value is incremented with each notification from said traffic control unit that said packet loss rate has exceeded the predetermined set value, and said call control unit does not establish a link between said Internet protocol network and said extension telephone if the count value exceeds the predetermined set value.

9. The Internet protocol network alternate routing system according to claim 8 wherein the packet loss rate in said sender report packet is variable.

10. The Internet protocol network alternate routing system according to claim 8 wherein said switch control unit can be manually switched.

11. The Internet protocol network alternate routing system according to claim 9 wherein said switch control unit can be manually switched.

12. The Internet protocol network alternate routing system according to claim 1 wherein said switch control unit can be manually switched.

* * * * *